United States Patent [19]

Bitzer et al.

[11] Patent Number: 5,247,234
[45] Date of Patent: Sep. 21, 1993

[54] CONTROL ARRANGEMENT

[75] Inventors: Rainer Bitzer, Weil der Stadt; Peter Zieher, Eberdingen; Karl-Heinz Hagele, Vaihingen/Enz; Bernd Dittmer, Ludwigsburg; Rainer Burkel, Asperg, all of Fed. Rep. of Germany

[73] Assignee: Robert Bosch GmbH, Stuttgart, Fed. Rep. of Germany

[21] Appl. No.: 613,772
[22] PCT Filed: Feb. 22, 1990
[86] PCT No.: PCT/DE90/00119
§ 371 Date: Nov. 19, 1990
§ 102(e) Date: Nov. 19, 1990
[87] PCT Pub. No.: WO90/11555
PCT Pub. Date: Oct. 4, 1990

[30] Foreign Application Priority Data

Mar. 18, 1989 [DE] Fed. Rep. of Germany ....... 3909041

[51] Int. Cl.$^5$ .............................................. G05B 15/02
[52] U.S. Cl. ..................................... 318/603; 318/591; 318/610; 280/707; 280/772; 364/424.05
[58] Field of Search .................................. 318/560–646; 364/424–426, 161–163; 251/129.1; 180/902; 280/707, 735, 772

[56] References Cited

U.S. PATENT DOCUMENTS 3,623,077 11/1971 Clark .
4,253,141 2/1981 Suzuki et al. ......................... 364/104
4,504,000 4/1985 Ferguson ............................. 318/591
5,037,119 8/1991 Takehara et al. ................... 280/707
5,119,297 6/1992 Buma et al. ..................... 364/424.05
5,142,476 8/1992 Shibata et al. .................. 364/424.05

FOREIGN PATENT DOCUMENTS 58137230 2/1985 Japan .

Primary Examiner—Paul Ip
Attorney, Agent, or Firm—Walter Ottesen

[57] ABSTRACT

The invention relates to an electric control arrangement for generating analog manipulated variables, having at least one basic controller circuit having a particular controller structure. The transfer function of the basic controller circuit, which is determined by the controller structure, is established with respect to magnitude by means of controller parameters and is supplied with an analog control-difference signal formed from desired value and actual value. A digital adjusting arrangement is provided for simple adaptation to the particular controlling task with the least possible complexity as to computation. The digital adjusting arrangement 34, on the basis of digital input quantities, selects at least one basic controller circuit 12 having a particular controller structure from several basic controller circuits 12 and switches this basic controller circuit 12 into the analog control loop and/or allows a variation of the controller parameters. Moreover, a corresponding method for controlling analog quantities is specified.

23 Claims, 1 Drawing Sheet

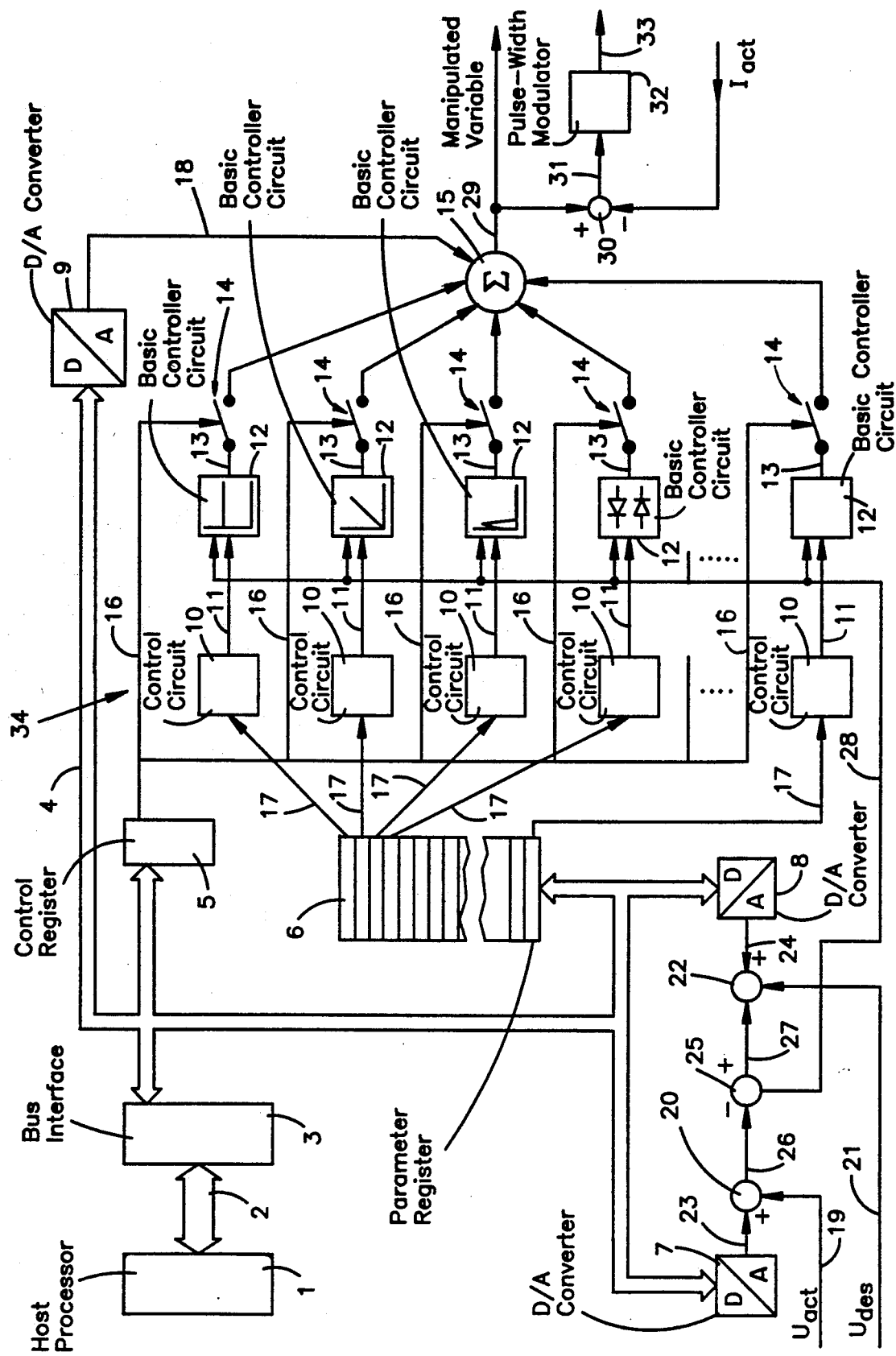

CONTROL ARRANGEMENT

FIELD OF THE INVENTION

The invention relates to an electric control arrangement for generating analog manipulated variables in accordance with the preamble of the main claim.

In addition, the invention relates to a method for controlling analog quantities by means of a controller effecting analog, time-discrete, amplitude-continuous signal processing.

BACKGROUND OF THE INVENTION

Actuating systems, for example for a damping valve in the chassis control of a motor vehicle, have time constants within a range from 1 to 10 ms. If such an actuator is digitally controlled, a processor required for this purpose in the control device concerned must process the controller difference equation concerned with sampling intervals in the order of magnitude of up to 10 $\mu$s. By implementing the digital controller by means of a computer program, a large proportion of the processor capacity is used up, particularly if several control loops have to be implemented and operated. Since in most cases a large number of other processes and algorithms are also programmed on the microcontrollers of the control devices, the sampling time predetermined by systems theory and the associated computing power is frequently not available for such actuating control loops. If necessary, the use of multi-processor systems could provide a remedy.

Alternatively, there is the possibility of implementing the control arrangement in conventional analog technology. However, this results in the disadvantage that such a solution is very inflexible and that the transfer functions and parameters of the analog controllers disperse with the tolerances of the electronic components.

SUMMARY OF THE INVENTION

By comparison, the control arrangement according to the invention with the features named in the main claim, has the advantage that it can be adapted in a simple manner to the control task given in each case and is essentially free of influences changing the transfer function or the controller parameters, respectively.

By implementing the control arrangement both in digital and in analog technology, the advantages of these two embodiments can be utilized in each case. The analog construction of the controller makes the digital processing of the controller difference equation unnecessary so that the processor capacity not needed as a result is available for other tasks. The digital adjusting arrangement permits the provision of a controller optimized for the respective control task. Due to the electronic adjustment of the transfer function by selecting a corresponding controller structure (for example, P controller (proportional characteristic), D controller (differential characteristic), I controller (integral characteristic and so forth) and/or also by digitally varying the controller parameters which determine the transfer function with respect to magnitude, a change matching the respective actuating system can be carried out at any time before and even during operation. This allows for great flexibility. Moreover, it is also conceivable that, at the same time, several basic controller circuits of a particular controller structure are combined with one another so that, for example, a PD controller or a PI controller or else even a PID controller and so forth can be implemented in a very simple manner. Dispersions in the transfer functions or parameters, such as occur due to the tolerances of the components in analog controllers, are avoided.

According to a further development of the invention, the adjusting arrangement is connected to a bus and the controller structure and/or the controller parameters can be varied via the bus. Thus, a bus, which is present in any case in the actuating system, can also be utilized for this task.

A bus interface is preferably provided which is connected via the bus to a control register for switching on the respective controller structure or structures and to a parameter register for adjusting the respective controller parameters. Accordingly, the control and parameter register are accessible via the processor to the bus interface in order to be able to perform the desired controller tuning. According to a preferred embodiment, the bus interface is connected to a host processor. The arrangement can be constructed in such a manner that each basic controller circuit can be connected to a summing point via an electronic switch which can be controlled by the control register. The control register selects and controls the electronic switch or switches so that the corresponding basic controller circuit is connected to the summing point. The basic controller circuits exhibit basic controller functions such as, for example, P, I or D characteristics. Moreover, further functions still to be defined, such as switching functions, characteristic curves and so forth, can be implemented.

A particularly simple possibility for varying the controller parameters results from the fact that to each basic controller circuit a control circuit is allocated. This control circuit is controlled by the parameter register and controls the controller parameters. The controller parameters are preferably adjusted by means of switched-capacitor elements (SC elements, switched capacitors). This can be done by adding further capacitors to the SC element by means of electronic switching elements and/or by means of switching frequency changes.

The analog desired value and actual value is in each case supplied to a summing point which is connected to the basic controller circuits. In this arrangement, it is possible to supply the desired value and the actual value via an analog signal path. Alternatively, however, the arrangement can also be constructed in such a manner that in each case a digital/analog converter (D/A converter) for supplying the desired value and actual value coming from the bus interface is connected to the summing point. Accordingly, desired value and actual value, coming from the processor, are supplied to the D/A converters via the bus interface and the analog values thus formed are supplied to the summing point.

A digital/analog converter connected to the bus and the summing point is preferably provided for connecting a manipulated-variable component. This manipulated-variable component can be, for example, a characteristic-field value or a correction value. This provides the processor with the possibility of effecting a precontrol of the characteristic-field value or a correction value. This provides the processor with the possibility of effecting a precontrol of the characteristic field or a correction intervention.

A pulse-width modulator is connected to the output of the summing point in order to convert the manipulated variable directly into switching signals for output stage transistors or the like which operate the actual actuating device. A secondary current-control loop is preferably provided for output stages in switching mode. Furthermore, output stage and actuator diagnostic functions can also be provided.

The desired value and the actual value of the control arrangement according to the invention are preferably electric voltages. The current control mentioned is preferably used for controlling the actual-value current.

A preferred circuit configuration is obtained if the control arrangement is constructed as an integrated circuit (IC circuit) and/or of hybrid circuits. Such a controller IC or controller hybrid could be preferably designed as a peripheral chip for microprocessors or for microcontrollers, or a "local electronics" component with CAN interface (CAN controller) could be provided.

The invention also relates to a method for controlling analog quantities by means of a controller performing analog signal processing. The transfer function and the controller parameters determining it with respect to magnitude are determined by digital adjustment of the controller. Due to the analog controller signal path, considerable computing capacity is saved compared to a controller implemented in digital technique by means of a computing program since the processing of the controller difference equation, which must be performed within relatively short sampling intervals, is omitted. Transfer function or controller parameters, respectively, can be adjusted in a simple manner via the host processor by means of the digital adjustment of the controller. This can be done preferably via a bus connection. The transfer function suitable for the respective control task can be preferably selected by digital actuation from several transfer functions kept available by means of corresponding basic controller circuits. To generate transfer functions deviating from the various basic types (for example P, D or I type), various basic controller circuits can also preferably be combined with one another.

Further developments of the invention are characterized in the subclaims.

BRIEF DESCRIPTION OF THE DRAWING

The invention will now be explained in greater detail with reference to the single figure of the drawing which shows a block diagram of an embodiment of the control arrangement according to the invention for generating analog manipulated variables.

DESCRIPTION OF THE PREFERRED EMBODIMENTS OF THE INVENTION

A host processor 1 is connected to a bus interface 3 via a bus 2. In addition, a further bus 4 is provided which is connected to the bus interface 3, a control register 5, a parameter register 6 and to digital/analog converters 7, 8 and 9.

The control arrangement also exhibits several control circuits 10 which are connected to basic controller circuits 12 via lines 11. The two rows of dots in the figure indicate that further such assemblies can be provided in addition to the control circuits 10 and basic controller circuits 12 shown.

The outputs 13 of the basic controller circuits 12 are connected via electronic switches 14 to a summing point 15. The electronic switches 14 are operated by the control register 5 via lines 16. Furthermore, the control circuits 10 are connected via lines 17 to the parameter register 6. The output of the digital/analog converter 9 is connected to the summing point 15 via a line 18.

The analog actual value $U_{act}$ is supplied to the control arrangement via a line 19 which is connected to a summing point 20. The desired value $U_{des}$ is passed via a line 21 to a further summing point 22. The digital/analog converters 7 and 8 are connected to the summing points 20 and 22, respectively, via lines 23 and 24. Furthermore, a summing point 25 is provided which is connected to the summing points 20 and 22, respectively, via lines 26 and 27. In this connection, the arrangement is constructed in such a manner that the actual value $U_{act}$ is supplied with negative sign to the summing point 25 and the desired value $U_{des}$ is supplied with positive sign to the summing point 25.

A line 28 originates from the summing point 25 and is connected to the individual basic controller circuits 12.

The control arrangement provides the manipulated variable on the output line 29. The output line 29 leads—with positive sign—to a further summing point 30 which is supplied—with negative sign—with an actual-value current $I_{act}$. The output 31 of the summing point 30 is connected to a pulse-width modulator 32 which exhibits an output 33.

The above makes it clear that the summing points 20 and 22, the summing point 25, the basic controller circuits 12, the electronic switches 14, the summing point 15 and the summing point 30 are located in a signal path with analog structure which carries analog quantities. By comparison, however, digital signals are conducted via the bus 2 and the bus 4 and lines 17 and, if necessary, also via lines 11 and/or 16. Accordingly, a digital adjusting arrangement 34 is formed which is composed of the control register 5, the digital/analog converter 9, the electronic switches 14, the parameter register 6 and the control circuits 10. This adjusting arrangement 34 can be controlled by the host processor 1 via the bus 2 as well as the bus interface 3 and the bus 4.

The figure shows that the individual basic controller circuits 12 make it possible to implement different basic controller functions; thus, for example, a P characteristic (proportional characteristic), I characteristic (integral characteristic) or a D characteristic (differential characteristic) are provided as well as further functions, to be defined as required, such as switching functions, characteristic curve functions and so forth. The electronic switches 14 can be operated in any way by the control register 5 via the lines 16 so that correspondingly selected basic control circuits 12 can be connected to the summing point 15. This makes it possible to switch the transfer function of the respective basic controller circuits 12 into the analog signal path. The selection of only one basic controller circuit 12 is conceivable, as a result of which, for example, a basic controller function can be implemented. If several basic controller circuits 12 are connected to the summing point 15, this will result in an appropriate composite transfer function. Accordingly, the latter can be individually selected and/or varied during operation—corresponding to the particular control task—via the control register 5 by being driven by the host processor 1.

As previously described, the parameter register 6 is also connected to the host processor 1 so that here, too, the host processor 1 can exercise a corresponding control function. The switching frequencies of the control circuits 10 are controlled via the lines 17. The switching frequency set in each case is supplied via the corresponding line 11 to the associated basic controller circuit 12 and is used to control switched-capacitor elements (SC elements) by means of which the controller parameters of the individual basic controller circuits 12 can be varied. The controller parameters determine the magnitude of the respective associated transfer function. In addition or alternatively, the controller parameters can also be controlled via capacity changes of the SC elements. This can be done by adding or disconnecting further capacitors.

The actual value $U_{act}$ and the desired value $U_{des}$ are supplied to the summing point 25 of the described control arrangement via lines 19 and 21 and summing points 20 and 22 and lines 26 and 27. At the output of the summing point 25, a control difference signal is formed which is supplied to the basic controller circuits 12 via the line 28. The transfer function formed by the basic controller circuits 12 depends on the switching state of the electronic switches 14 controlled by the host processor 1. Accordingly, the controller difference signal is processed—in accordance with the transfer function selected—and the result is supplied to the summing point 15. Moreover, the summing point 15 can be supplied with a manipulated-variable component, which can be influenced by the host processor 1, via the digital/analog converter 9. This manipulated-variable component can be a characteristic-field value or a correction value.

At the output line 29, the analog manipulated variable is present which can be used for controlling an actuating device, not shown. If the manipulated variable is to be converted into switching signals, for example for output stage transistors, it is provided to supply the manipulated variable to the summing point 30 and from there to the pulse-width modulator 32. The latter provides a pulse-width signal corresponding to the manipulated variable at its output 33. A secondary current-control loop, which is connected to the summing point 30, is preferably provided for the mentioned output stages operating in switched mode. The latter summing point is supplied with the actual-value current $I_{act}$.

If a continuous output stage operation is to be effected, a corresponding control block can be used alternatively instead of the pulse-width modulator 33.

Alternatively to the supplying of desired value $U_{des}$ and actual value $U_{act}$ as analog values via lines 21 and 19, it is provided (in accordance with a different operating mode of the control arrangement) that desired value and actual value—coming from the host processor 1—are supplied to the digital/analog converters 7 and 8 via the bus 2, the bus interface 3 and the bus 4. The analog signals formed there are then supplied to the summing point 25 via lines 23 and 24 and summing points 20 and 22 and lines 26 and 27.

Consequently, the following are accessible from the host processor 1: the control register 5 for determining the transfer function, the parameter register 6 for determining the controller parameters, the digital/analog converter 9 for applying characteristic-field values and/or correction values and the digital/analog converters 7 and 8 for supplying desired value and actual value.

The control arrangement described is preferably constructed as an integrated circuit (IC circuit) and/or hybrid circuits. Such a controller IC or controller hybrid can be designed as peripheral chip for microprocessors or microcontrollers.

The control arrangement according to the invention has the advantage that no analog/digital conversion and digital/analog reconversion of analog signals is necessary in the controller. The controller structure (transfer function) and the controller parameters can be varied by the host processor via digital signal paths. Accurate reproducible basic controller circuits can be implemented with respect to the transfer function via the SC elements.

We claim:

1. An electric control arrangement for generating analog manipulated variables in an analog control loop, the control arrangement comprising;
   a plurality of basic controller circuits; each of said basic controller circuits having a specific controller structure and having a transfer function defined by the specific controller structure corresponding thereto, said transfer function being determined with respect to magnitude by control parameters;
   analog supply means for supplying a control reference signal formed from actual and desired values to said basic controller circuits; and,
   a digital adjusting unit receiving digital input variables, the digital adjusting unit including: selection means for selecting a particular one of said basic controller circuits based upon said digital input variables; and, switching means for switching said one basic controller circuit into the analog control loop likewise based upon said digital input variables.

2. The control arrangement of claim 1, wherein said digital adjusting unit includes control circuit means for effecting a change in the control parameters of said one basic controller circuit.

3. The control arrangement of claim 1, wherein said digital adjusting unit is connected to a bus via which at least one of the controller structure and the controller parameters can be varied.

4. The control arrangement of claim 3, wherein a bus interface is connected via the bus to a control register for switching on at least one of basic controller circuits and to a parameter register for adjusting the controller parameters.

5. The control arrangement of claim 4, wherein the bus interface is connected to a host processor.

6. The control arrangement of claim 1, wherein each basic control circuit is connected to a summing point via switching means which can be controlled by a control register.

7. The control arrangement of claim 2, wherein said control circuit means includes a plurality of control circuits corresponding to respective ones of said controller circuits; and a parameter register controls said control circuits fir controlling the controller parameters.

8. The control arrangement of claim 7, wherein the controller parameters are adjusted by means of switched-capacitor elements.

9. The control arrangement of claim 8, wherein said control circuits control the controller parameters via at least one of clock frequency and capacity changes of the switch-capacitor elements.

10. The control arrangement of claim 1, wherein the desired value $U_{des}$ and the actual value $U_{act}$ are supplied to a summing point which is connected to the basic controller circuits.

11. The control arrangement of claim 10, wherein a digital/analog converter for supplying the desired value and actual value ($U_{des}$, $U_{act}$) coming from the bus interface 3 is connected to the summing point.

12. The control arrangement of claim 11, wherein a further digital/analog converter is connected to the bus and to the summing point for applying a manipulated-variable component.

13. The control arrangement of claim 1, wherein the manipulated-variable component is a characteristic-field value or a correction value.

14. The control arrangement of claim 12, wherein a pulse-width modulator for generating switching signals for an actuation device output stage is connected to the output of the summing point.

15. The control arrangement of claim 14, wherein a secondary current control is connected to the output of the pulse-width modulator.

16. The control arrangement of claim 1, wherein the desired value and actual value ($U_{des}$, $U_{act}$) are electric voltages and the current control is used for controlling the actual-value current $I_{act}$.

17. The control arrangement of claim 1, wherein the control arrangement is configured of at least one of an integrated circuit and of hybrid circuits.

18. In an electric control arrangement for generating analog manipulated variables in an analog control loop, the control arrangement including a plurality of basic controller circuits; each of said basic controller circuits having a specific controller structure and having a transfer function defined by the specific controller structure corresponding thereto, said transfer function being determined with respect to magnitude by control parameters; analog supply means for supplying a control reference signal formed from actual and desired values to said basic controller circuits; a digital adjusting unit receiving digital input variables and including: selection means and switching means; a method for controlling analog variables by means of a controller performing analog signal processing, the method comprising the steps of:
    utilizing said selection means for selecting a particular one of said basic controller circuits based upon said digital input variables;
    utilizing said switching means for switching said particular one of said basic controller circuits into said analog control loop likewise based upon said digital input variables; and,
    determining the transfer function and the control parameters by digitally adjusting the controller.

19. The method of claim 18, wherein the transfer function and the controller parameters can be varied via a bus connection.

20. The method of claim 18, wherein the transfer function suitable for the particular control task is selected by digital actuation from several transfer functions kept available by means of corresponding basic controller circuits.

21. The method of claim 18, wherein the various basic controller circuits are combined with one another.

22. The method of claim 18, wherein at least one of the basic controller circuits is selected by means of a processor.

23. An electric control arrangement for generating analog manipulated variables in an analog control loop, the control arrangement comprising:
    a plurality of basic controller circuits; each of said basic controller circuits having a specific controller structure and having a transfer function defined by the specific controller structure corresponding thereto, said transfer function being determined with respect to magnitude by control parameters;
    analog supply means for supplying a control reference signal formed from actual and desired values to said basic controller circuits;
    a digital adjusting unit receiving digital input variables, the digital adjusting unit including: selection means for selecting a particular one of said basic controller circuits based upon said digital input variables and, switching means for switching said one basic controller circuit into the analog control loop likewise based upon said digital input variables;
    said digital adjusting unit includes control circuit means for effecting a change in the control parameters of said one basic controller circuit; and,
    said control parameters being varied by means of switched-capacitor elements.

* * * * *

UNITED STATES PATENT AND TRADEMARK OFFICE
CERTIFICATE OF CORRECTION

PATENT NO. : 5,247,234

DATED : September 21, 1993

INVENTOR(S) : Rainer Bitzer, Peter Zieher, Karl-Heinz Hagele, Bernd Dittmer and Rainer Burkel It is certified that error appears in the above-identified patent and that said Letters Patent is hereby corrected as shown below:

On title page, item [56], "U.S. PATENT DOCUMENTS" delete "4,504,000  4/1985  Ferguson .................. 318/591" and substitute therefor:
-- 4,509,000  4/1985  Ferguson .................. 318/591 --.

In column 1, lines 41 and 42: delete "with the features named in the main claim,".

In column 6, line 10: delete ";" and substitute -- : -- therefor.

In column 6, line 52: delete "fir" and substitute -- for -- therefor.

Signed and Sealed this

Twelfth Day of April, 1994

Attest:

*Attesting Officer*

BRUCE LEHMAN

*Commissioner of Patents and Trademarks*